F. HAWKINS.
SPRING BUTTON, DRESS FASTENER, AND THE LIKE.
APPLICATION FILED APR. 20, 1920.
1,343,506.
Patented June 15, 1920.
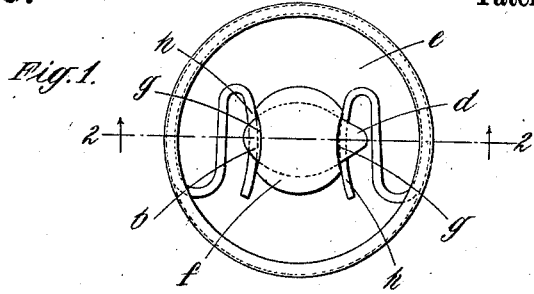
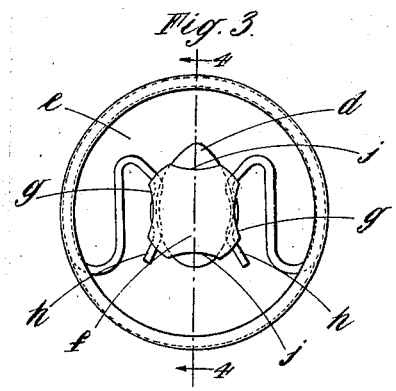
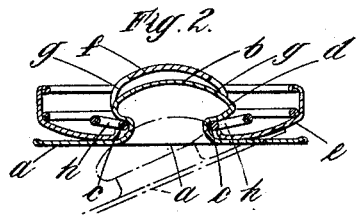
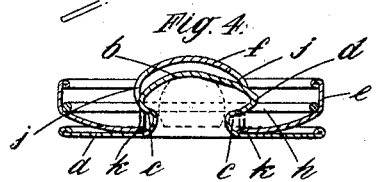
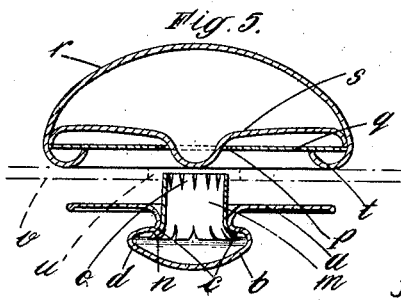
Inventor,
Frank Hawkins
W. H. Lockwood
Attorney

UNITED STATES PATENT OFFICE.

FRANK HAWKINS, OF SITTINGBOURNE, ENGLAND.

SPRING-BUTTON, DRESS-FASTENER, AND THE LIKE.

1,343,506.   Specification of Letters Patent.   Patented June 15, 1920.

Application filed April 20, 1920. Serial No. 375,346.

*To all whom it may concern:*

Be it known that I, FRANK HAWKINS, of 40 Dover street, Sittingbourne, in the county of Kent, England, a subject of the King of Great Britain, have invented certain new and useful Improvements in Spring-Buttons, Dress-Fasteners, and the like, of which the following is a specification.

This invention relates to spring buttons, dress fasteners and the like wherein one of the engaging parts is provided with a resilient portion which coacts with a corresponding rigid portion of the other part to retain the parts in engagement. A spring button of this kind has been proposed in which the stud constituting the male member is formed with a divided head to provide a spring portion, one half of said head being laterally extended more than the other. The underside of the head, however, is rounded to enable the head to be drawn out of engagement with the female portion and the construction is such that the fastener is liable to become undone accidentally. It has also been proposed to form the head of a stud used in a non-spring boot fastener, with a pointed lateral extension having a flat underface.

The object of the present invention is to provide an improved form of spring button, dress fastener or the like which is not liable to become undone accidentally.

In a spring button, dress fastener, or the like made in accordance with this invention, the underside of the head of the male member is substantially flat, and one side of said head is pointed and extended laterally, while the female member is suitably apertured, and the springs are so arranged as to tend to retain the male member in such a position relatively to the female member that the flat underside of the former overlies the mating parts of the latter, so that when the pointed lateral extension of the head has been introduced between the spring fingers with the axis of the male member inclined to that of the female member, the male member may be moved (with its axis still inclined) toward one side of the axis of the female member against the action of one of the spring fingers, the pointed lateral extension of the head passing through a lateral aperture in the female member, after which the axis of the male member having been brought parallel with that of the female member, the male member may be allowed to be moved by the stress of the displaced spring finger to a position in which the axes of the two members coincide and the underside of the head engages over both spring fingers, thus securing the fastening, which can only be undone by a reversal of the operation just described.

In some cases, although so much of the under-surface of the head of the male member as engages over the spring fingers is substantially flat, the underside of the pointed lateral extension of said head may be upwardly beveled toward the point, to facilitate the introduction and withdrawal of the head into and from its position of engagement.

The mounting of the spring fingers may be effected in a well known manner.

The invention is illustrated by the accompanying drawings wherein Figure 1 is a plan of one form of fastening device, Fig. 2 is a cross-section on the line 2—2, Fig. 1, and Figs. 3 and 4 are similar views of a modified form of fastening, Fig. 4 being a cross-section on the line 4—4, Fig. 3, while Fig. 5 is a central cross section of a button embodying one form of this invention.

In the form of fastening device shown in Figs. 1 and 2 the male member $a$ has a head $b$ whereof the underside is substantially flat as at $c$, and one side of said head is pointed and extended laterally as at $d$, the underside of the pointed lateral extension $d$ being upwardly beveled toward the point to facilitate the introduction and withdrawal of the head $b$, into and from its position of engagement as hereinafter set forth. The female member $e$ has a cupped portion $f$ adapted to receive the head $b$, said cupped portion $f$ being apertured as at $g, g$ so that when the pointed lateral extension $d$ has been introduced between the usual spring fingers $h, h$ with the axis of the male member $a$ inclined to that of the female member $e$ as indicated in dotted lines in Fig. 2, the male member $a$ may be moved (with its axis still inclined) toward one side of the axis of the female member $e$, to the right Fig. 2, against the action of the right hand spring finger $h$, the pointed lateral extension $d$ passing through the right hand lateral aperture $g$ after which the axis of the male member $a$ having been brought parallel with that of the female member $e$, the male member $a$ may be allowed to be moved to the left by the stress of the displaced spring finger $h$ to a position (as shown) in which the axes of the two members $a$ and $e$ coincide and the flat portions $c$ on the underside of the head $b$ engage over both spring fingers $h$, $h$ thus securing the fastening, which can only be undone by a reversal of the operation just described.

In accordance with a modification of this invention the pointed lateral extension $d$ instead of being introduced into the female member $e$ at right angles to a spring finger $h$ may be introduced in a direction substantially parallel with the spring fingers $h$, $h$ for which purpose the cupped portion $f$ is formed with apertures $j$, $j$, Figs. 3 and 4, which may be substituted for, or in addition to, the apertures $g$, $g$ while the female member $e$ is downturned slightly at the mouth of the cupped portion $f$ as indicated at $k$, $k$ Fig. 4. In this case the flat portions $c$ on the underside of the head $b$ are situated only adjacent the pointed lateral extension $d$ and at the opposite side of the head $b$. When the head $b$ has been introduced into the female member $e$ as above set forth it cannot be separated therefrom by a direct pull even though the underside of the head $b$ is rounded where engaged by the spring fingers $h$, $h$ as the pointed lateral extension $d$ and the opposite side of the head engage the disk-like base of the female member $e$. The two members can only be separated by reversing the operation of introduction described above. In order to prevent accidental movement of the head $b$ in the direction of the spring fingers $h$, $h$ the latter may be bowed slightly symmetrically about the axis of the female member $e$ as indicated in Fig. 3.

Fig. 5 shows how a fastening device constructed in accordance with this invention may be employed in combination with a hollow metal button top. The head $b$ of the male member $a$ of the fastening device is furnished with a shank $m$ which may be tubular and have one of its ends split and expanded as at $n$ within the head $b$ while its other end is split as at $o$ and adapted to be passed through an aperture $p$ in the back $q$ of a button whereof the crown $r$ may be stamped or otherwise formed to represent any naval or military regulation button, a livery or other fancy button. Within the crown $r$ is disposed a deflecting plate $s$ whereof the central portion is substantially conical and adapted to project into the aperture $p$ in the back $q$, said back and deflecting plate being secured in position by the curled over edge $t$ of the crown $r$ or in any other known manner. The shank $m$ is of such length that it may be passed through an aperture $u$ in the material $v$ (indicated in dot and dash lines) and through the aperture $p$ in the back $q$ and when the parts are pressed together the split end $o$ will be expanded by the deflecting plate $s$ and secure the male member $a$ to the button. The female member (not shown) of the fastening device is secured to the other piece of material to be fastened and the two members $a$ and $e$ are fastened together as above set forth.

What I claim and desire to secure by Letters Patent is:—

A spring button, dress fastener, or the like, of the kind hereinbefore set forth, whereof the underside of the head of the male member is substantially flat, and one side of said head is pointed and extended laterally, while the female member is suitably apertured, and the springs are so arranged as to tend to retain the male member in such a position relatively to the female member that the flat underside of the former overlies the mating parts of the latter so that when the pointed lateral extension of the head has been introduced between the spring fingers with the axis of the male member inclined to that of the female member, the male member may be moved (with its axis still inclined) toward one side of the axis of the female member against the action of one of the spring fingers, the pointed lateral extension of the head passing through a lateral aperture in the female member, after which the axis of the male member having been brought parallel with that of the female member, the male member may be allowed to be moved by the stress of the displaced spring to a position in which the axes of the two members coincide and the underside of the head engages over both spring fingers, substantially as set forth.

FRANK HAWKINS.